United States Patent
Macey

[15] 3,647,367
[45] Mar. 7, 1972

[54] METHOD FOR MAKING ANHYDROUS MAGNESIUM CHLORIDE

[72] Inventor: James G. Macey, Salt Lake City, Utah

[73] Assignees: Pete Prestininni, Long Beach, Calif.; Ruth G. Macey; Ann M. Macey, , part interest to each

[22] Filed: Dec. 29, 1969

[21] Appl. No.: 888,774

[52] U.S. Cl. ...................................23/91, 23/100, 23/262, 23/264, 25/2, 264/129
[51] Int. Cl. .......................................C01f 5/30, C01c 1/16
[58] Field of Search.......................................23/91, 100, 1 D

[56] References Cited

UNITED STATES PATENTS

| | | | |
|---|---|---|---|
| 1,276,499 | 8/1918 | Dantsizen | 23/91 |
| 1,875,013 | 8/1932 | Kaselitz | 23/91 X |
| 3,347,625 | 10/1967 | Kimberlin, Jr. et al. | 23/100 X |

*Primary Examiner*—Edward Stern
*Attorney*—Donald E. Nist

[57] ABSTRACT

Anhydrous purified magnesium chloride is made from anhydrous ammonium carnallite in a specially adapted apparatus by decomposing the anhydrous ammonium carnallite in the substantial absence of contaminants, employing superheated molten magnesium chloride as the heating source, ammonium chloride vapor and molten magnesium chloride being recovered separately, and any residual magnesium oxide being precipitated from the molten magnesium chloride.

3 Claims, 1 Drawing Figure

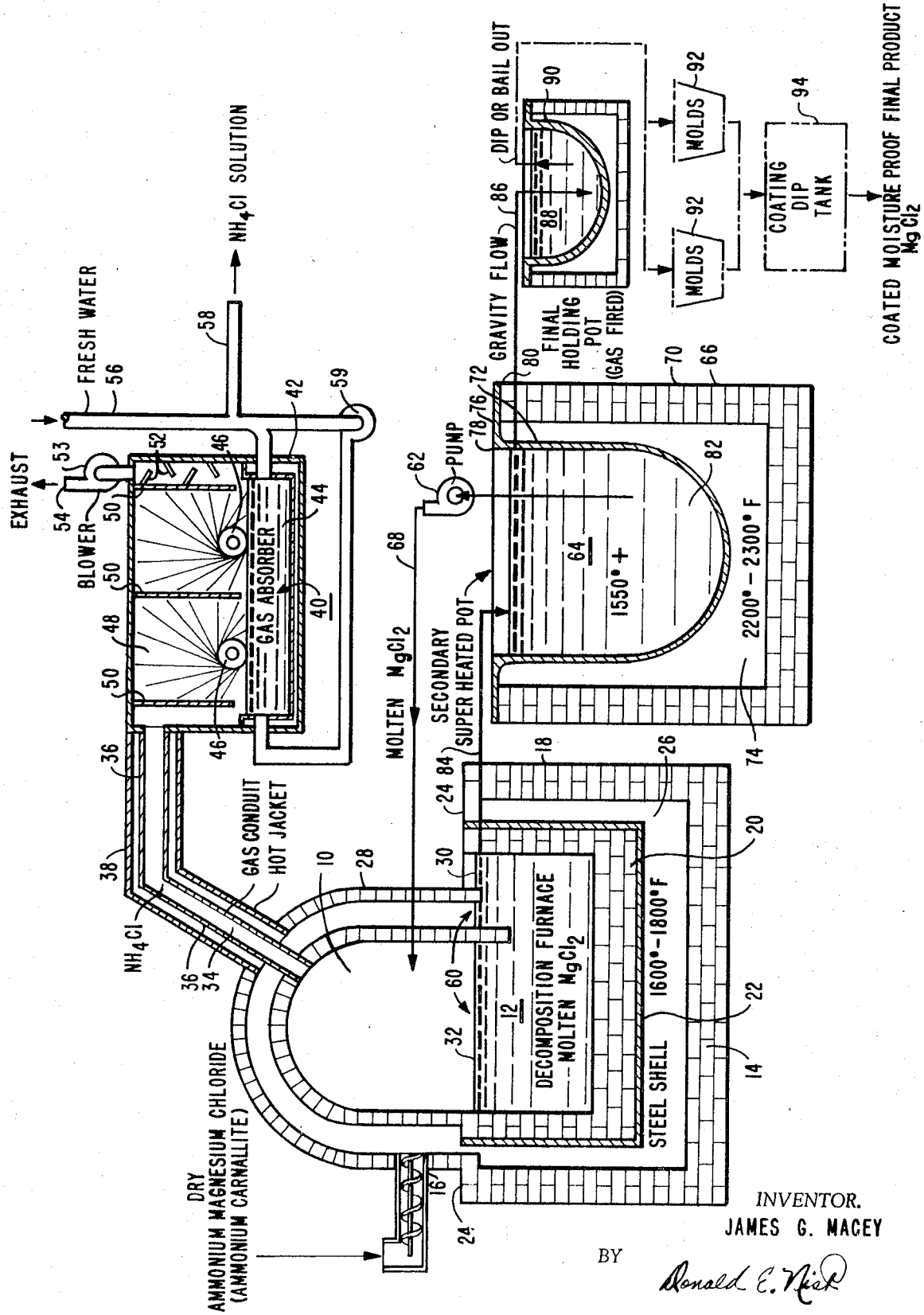

METHOD FOR MAKING ANHYDROUS MAGNESIUM CHLORIDE

FIELD OF INVENTION

This invention generally pertains to the field of preparation and recovery of purified inorganic salts, specifically magnesium chloride.

BACKGROUND

Magnesium chloride, particularly in the anhydrous purified state substantially free of contaminants, is highly useful for a variety of purposes, including the manufacture of magnesium metal and chlorine by electrolytic decomposition thereof. Certain concentrated brines, such as the Great Salt Lake water, contain appreciable amounts of magnesium chloride. Difficulties are encountered, however, in economically recovering these values from such a source in sufficiently pure form so as to be immediately useful for magnesium metal production. It is possible to desulfate and deborate magnesium— and chlorine— containing concentrated brine with quick lime. Traces of calcium can, if desired, be removed by treatment with sodium carbonate and separation of calcium carbonate precipitate. Thereafter the aqueous solution containing magnesium and chlorine ions can be reacted with strong aqueous ammonium chloride to form ammonium carnallite in heated solution, thereafter precipitating the crystalline form as $NH_4Cl \cdot Mg \cdot Cl_2 \cdot 6H_2O$ from solution at ambient temperature. Upon washing with clean pure water, as in a centrifuge, these crystals are relatively pure in content. Complete removal of bound and unbound water from the crystals can be accomplished by initially spray drying the crystals down to an average of about $3H_2O$ bound water under the usual spray-drying conditions and thereafter removing final bound water by rotary drying at less than about 425° F. product temperature until the finished product, ammonium carnallite, is anhydrous.

A practical inexpensive procedure and apparatus have been sought for converting anhydrous ammonium carnallite into anhydrous magnesium chloride without contaminating or decomposing the magnesium chloride so as to render it undesirable for a variety of purposes. In this connection, the presence of substantial amounts of magnesia and/or water in magnesium chloride greatly reduce its utility as feed for electrolytic decomposition cells since these contaminants poison the cells.

OBJECTS

Accordingly, a principal object of the present invention is to provide improved means and method for inexpensively and simply preparing purified anhydrous magnesium chloride from purified anhydrous ammonium carnallite.

It is a further object of the invention to provide a simple, inexpensive method utilizing readily available ingredients and processing conditions to accomplish the aforesaid purposes.

It is an important object of this invention to accomplish the decomposition of anhydrous ammonium carnallite in such a way and under such conditions that breakdown or decomposition of the $NH_4Cl$ component is held to a very low figure. Excessive loss of $NH_4Cl$ would mean a prohibitively high cost for this reagent.

It is also an object of the invention to provide durable, efficient apparatus exhibiting low operating and maintenance costs for accomplishing the aforesaid purposes.

DRAWINGS

Further objects and advantages of the invention will be apparent from a study of the following detailed description and the accompanying drawings of which:

The single FIGURE is a schematic side elevation partly in cross section of a preferred embodiment of apparatus of the invention useful in preparing purified anhydrous magnesium chloride.

GENERAL DESCRIPTION

The general description of the invention is as set forth in the Abstract above.

DETAILED DESCRIPTION

The present method is capable of being operated without the apparatus of the invention, but is most advantageously performed in such apparatus, a typical embodiment of which is schematically represented in the accompanying single FIGURE in side elevation, with portions in cross section to illustrate the internal construction thereof.

Now referring more particularly to the single Figure, the present method utilizes as starting material anhydrous ammonium carnallite ($NH_4Cl \cdot Mg \cdot Cl_2$) in particulate form. This starting material may be prepared in any suitable manner, as from aqueous brine concentrated from Great Salt Lake water or another aqueous initially containing magnesium and chlorine ions in substantial concentration by, for example, the following typical procedure:

1. A concentrated aqueous solution containing about 36 percent by volume of magnesium chloride derived from Great Salt Lake water and essentially free of boron, calcium, sulfate, sodium chloride, and other values is chemically reacted at about 230° F. with an aqueous solution containing about 22 percent by volume of ammonium chloride and then cooled to ambient temperature, the resulting ammonium carnallite crystals ($NH_4Cl \cdot MgCl_2 \cdot 6H_2O$) precipitating therefrom thereupon being harvested.
2. The harvested crystals are washed free of impurities while being filtered or centrifuged. They may be recrystallized, if desired, as insurance for purity.
3. The purified crystals are melted in their water of crystallization and spray dried to reduce the total water content to about 25 percent.
4. The spray dried powder comprising ammonium carnallite (approximately $NH_4Cl \cdot MgCl_2 \cdot 3H_2O$) is then fully dried below about 425° F. (product temperature), preferably below about 300° F. (product temperature) in a rotary drier to the anhydrous state ($NH_4Cl \cdot MgCl_2$).

Such anhydrous purified starting material is fed to the upper portion 10 of a decomposition zone 12, specifically a chamber 14 by an airtight screw-type feeder 16 (of Monel metal or the like) fully packed to essentially eliminate entry of water vapor, air and other contaminants into chamber 14. Chamber 14 may comprise an outer insulative ceramic shell 18 of, for example, silica brick, fire brick or the like and an inner shell 20 of silica brick spaced inwardly therefrom and containing an outer liner 22 of strong heat conductive material such as steel. Shells 18 and 20 are interconnected, as by a wall 24 of ceramic, to provide a heating space 26 connected to a heating means, not shown, such as air heated to 1,000° F. +, e.g., 1,600° F. and circulated therethrough to minimize a substantial temperature gradient within any contents held by shell 20. The upper portion 28 of chamber 14 is domed, comprising the spaced shells 18 and 20 and fabricated of insulative material, such as silica brick, to trap ammonium chloride vapor and allow its proper removal from chamber 14. A lower free-standing end 30 of portion 28 preferably extends about 10 inches below the surface of molten magnesium chloride disposed in an area 32 defined by shell 20 to prevent escape of ammonium chloride vapor from chamber 14 except through an insulated exit conduit 34 preferably comprising a shell 36 of Monel having an outer heating jacket 38 at least adjacent to portion 28 to keep the temperature at a suitable high temperature during removal. For example, jacket 38 may be air heated to about 550° F. or the like to prevent precipitation of ammonium chloride in the duct 34. Duct 34 leads to a gas absorber 40 comprising a vessel 42 containing a reservoir 44 of water and revolving drums 46 disposed to intersect the water level in reservoir 44 so as to create a mist or spray of fine water droplets in the upper portion 48 of the absorber 40. Depending spaced deflector panels 50 are disposed above that water level, as are slanted traps 52 in one end of the absorber 40 adjacent a gas exhaust line 53 and blower 54. Fresh water enters the absorber 40 via line 56 and aqueous ammonium chloride solution resulting from contact of the ammonium chloride vapor with the water mist (which laden mist then falls to reservoir 44) exits the absorber via line 58 for passage to a contact zone for reaction with magnesium chloride solution and formation of ammonium carnallite, as previously described, in the preparation of feed for the present method and apparatus. A liquid recirculation pump and line system, generally designated 59, may also be provided, if desired, as shown in the Figure.

In portion 28 of chamber 14, the anhydrous ammonium carnallite passes through ammonium chloride vapor (positive pressure zone) down to the surface of molten magnesium chloride directly under the portion 28, is heated in a reaction area 60 to above decomposition temperature i.e., above that temperature at which ammonium chloride sublimes, 639° F., and above that temperature which renders magnesium chloride molten i.e., 1,312° F., for example, to about 1,360° F. and preferably above about 1,400° F., such as a temperature above about 1,500° F., to release ammonium chloride vapor and form molten magnesium chloride. The ammonium chloride atmosphere prevents entry of air, water vapor and other contaminants into reaction area 60 so that magnesia does not form. Moreover, metal is completely absent in that area so that the thus-formed ammonium chloride is not broken down and this is reusable in the system. Proper heating of the molten magnesium chloride in chamber 14 is maintained by pumping, as by pump 62, molten magnesium chloride superheated to above about 1,500° F., for example, 1,600° F. or more from a separate superheating zone 64, specifically a chamber 66 through a line 68 into the area within the hollow portion 28 above the level 32 of molten magnesium chloride i.e., area 60 of chamber 14.

Chamber 66 comprises a hollow outer shell 70 of insulative material such as silica brick and an inner thick wall heat-conductive shell 72, preferably fabricated of steel or the like, spaced inwardly therefrom to form a heating space 74 closed by a peripheral rim 76 connected to the upper end 78 of shell 72 and also to upper end 80 of shell 70. Space 74 can be utilized to circulate hot natural gas combustion gases from a heating source e.g., gas furnace (not shown) at a temperature of, for example, 2,200°–2,300° F., into contact with the outer surface of shell 72 to superheat molten magnesium chloride disposed within shell 72 as a pool 82. Waste heat from space 72 can, if desired, be passed into space 26 to provide the desired heating thereof previously described.

Chamber 14 is provided with a gravity flow exit line 84 for supplying molten magnesium chloride to chamber 66 for superheating and return to chamber 14. Chamber 66 is provided with an exit line 86 for flow, preferably gravity flow, of molten magnesium chloride to a recovery zone 88, specifically one or a series of heat-conductive "holding" pots 90 provided with suitable heating means (not shown) such as natural gas fired, to keep the pot 90 at a temperature slightly above about 1,325° F. for example 1,340° F., just slightly above melting point, 1,306° F. of magnesium chloride, but below a temperature which would cause turbulence therein, for example 1,400° F.+. Thus it is desirable to hold the magnesium chloride at a temperature which, while keeping it molten, allows any magnesia formed therein to settle out (under normal conditions, however, little if any magnesia will be present). If turbulence occurs, any fine magnesia particles which may be present tend to be kept suspended in the molten magnesium chloride. Preferably, the holding time is about 2 hours, after which the molten magnesium chloride is dipped, decanted, bailed or otherwise separated from any such magnesia bottom fines and passed direct to a magnesium electrolytic process or to mold(s) 92 of conventional size and configuration to allow the magnesium chloride to solidify and to cool to about ambient or other suitable temperature. Thereafter, the molded magnesium chloride can be removed and dip coated in a tank of conventional configuration and construction, for example, steel, containing a strippable protective coating liquid to render them moisture proof, For example, liquid polyethylene at about 110° C.+ can be used in connection with tank 94 and a suitable heating means (not shown). The dipped molded pieces of magnesium chloride are removed from tank 94 and allowed to cool to solidify the protective film thereon. Such film can easily be peeled away before the solid magnesium chloride pieces are used, for example, in the production of magnesium and chlorine.

The liner 22 may be of ⅝-inch steel, shell 42, dividers 50 and 52 may be of Redwood throughout and pot 90 may be of 2-inch mild steel, while shell 72 may be of 3-inch steel or the like. Other components of the absorber may be monel metal or the like to resist corrosion. Lines 68, 84 and 86 can be of any suitable construction, e.g., thick steel pipe. Mold(s) 92 may be of ½-inch reinforced steel. Other components previously described can be of any suitable size, shape and construction consistent with the foregoing description and objects.

The present method can be run on a batch, semibatch or continuous basis, preferably the latter. Startup is difficult to do very often on a commercial basis and necessitates providing purified molten magnesium chloride in chambers 14 and 66 at the described operating temperatures and a cloud of ammonium chloride under positive pressure within the area enclosed by portion 28. For practical commercial purposes, a continuous operation is desired. Shutdowns should be very infrequent, preferably not more than once a year.

In the present method, it is important to note that enough heat must be furnished to chamber 14 to cause dry ammonium carnallite to break down to ammonium chloride and vaporize the same and to melt the thus-formed magnesium chloride. This heat must be furnished to the ammonium carnallite solid with no metal being present in the reaction area 60, and also no direct-fired gases or water vapor or air being present. Electric heat is too costly to permit its use for heating purposes, it being five times or more as expensive as gas heating. Moreover, no metals can be present, since they cannot withstand the corrosion problems in area 60 and catalyze a breakdown of $NH_4Cl$ in area 60 to nitrogen, hydrogen and hydrogen chloride, thereby raising the cost of operation excessively. Thus, heat exchange through metal walls is not possible in area 60. Accordingly, the present apparatus is designed to be operated utilizing indirect heating but only outside of area 60 i.e., dry gas firing by impingement of combustion gases on the outer surfaces of shell 72, liner 22 and pot 90. With the present system these requirements are met so that contamination of magnesium chloride and formation of magnesia are avoided, while breakdown and/or loss of ammonium chloride are also avoided. No water or oxygen is present in area 60 to foster oxidation of magnesium chloride to magnesia and hydrogen chloride as the magnesium chloride is formed. Although the single Figure illustrates the absence of shielding for the molten magnesium chloride in certain areas of chambers 14 and 66 and in pot 90, it will be understood that protective insulative covers could be employed by one ordinarily skilled in the art (in accordance with the disclosure) to seal in the molten magnesium chloride. It will be further understood that the most critical area for protection is area 60 where the described decomposition takes place. It is also important to protect ammonium chloride against precipitation in conduit 34 to prevent fouling of the conduit and prolonged contact with hot metal, with possible decomposition of the ammonium chloride. In the area 60 where the ammonium chloride first is formed and vaporizes it is hottest and it will be noted that there is no metal in this area i.e., portion 28 is ceramic not metallic.

The following Example further illustrates certain features of the invention:

EXAMPLE

In a typical reaction system employing apparatus as depicted in the single Figure previously described and capable of providing 50 plus pounds of anhydrous magnesium chloride per hour, 153 pounds of a relatively pure aqueous solution containing about 36 percent or 55 pounds of magnesium chloride per 13.5 gallons of solution are passed per hour to a hot reactor vessel along with 150 pounds of a relatively pure aqueous solution containing about 22 percent or 33 pounds of ammonium chloride per 17.1 gallons of solution. This solution inflow ratio is maintained. The solutions are reacted in the hot reactor to form ammonium carnallite at 230° F. For this purpose, the hot reactor is a ¼-inch Monel metal pot sitting over a gas-fired temperature-regulated fire box. The magnesium chloride input solution is derived by removing boron and sulfate ions from a magnesium chloride-containing aqueous solution having the same by precipitating some magnesium ion as magnesium hydroxide through the use of calcium oxide, the hydroxide stripping the solution of boron. The calcium oxide reacts to form calcium chloride which is turn reacts with sulfate ions to form calcium sulfate precipitate. Thus, the calcium oxide, if in excess, the sulfate, magnesium hydroxide and boron are removed from solution as precipitate.

The 30.6 gallons of ammonium carnallite solution per hour passes from the hot reactor through a heated exit line into a circulating pump connected to an 800-gallon redwood crystallizer reservoir held at below 80° F. and circulating solution at the rate of 15-20 gallons per minute. The crystallizer employs a fan and circulating pump of monel metal and operates at, for example, about 75° F. or below and is a rectangular redwood tank some 12'×3'×2' having a bottom tapered portion fitted with a screw conveyor leading to an upwardly inclined screw conveyor having a liquid bottom drain and lines for recirculating liquid to the crystallizer. Ammonium carnallite crystals form in the solution in the crystallizer, are passed in the solution at the rate of 157.6 pounds per hour from the crystallizer through the conveyor and are separated from the solution in the inclined conveyor and pass into a monel metal centrifuge where they are countercurrently washed with water to purify them and where the wash water is tripped therefrom and recirculated to the crystallizer. The centrifuged crystals pass to a silica brick heating kettle at the rate of about 151.5 pounds per hour, representing 55 pounds of magnesium chloride, 33 pounds of ammonium chloride and 63.5 of crystalline of bound water ($6H_2O$) plus about 6.1 pounds per hour of free water trapped with the crystals. The kettle has the same dimensions as the hot reactor. In the kettle the crystals are melted in the free water and the melt is fed at the rate of about 157.6 pounds per hour to a monel metal spray dryer of conventional size and shape, for example, about 4 feet in diameter, wherein the melt is reduced in water content from about 45 percent to about 25-30 percent. The dryer system employs a monel metal cyclone, connecting pipe and fan. Thus, the feed melts first to ammonium carnallite having $4H_2O$ then to that having about 3 $H_2O$ i.e., a dry appearing powder. The ammonium carnallite output of the spray drier, about 121.5 pounds per hour, is fed to a monel metal rotary dryer 24"×35' operating between about 300° F. and about 420° F. product temperature (with intake gases below 710° F.) wherein anhydrous ammonium carnallite is produced at the rate of about 88 pounds per hour.

The anhydrous ammonium carnallite is fed into a domed decomposition area within a decomposition chamber by a screw-type monel metal feed conveyor choked with the carnallite to prevent entry of air or moisture into the decomposition area, along with any other contaminants. The decomposition area is 21"×21"×4' high above the pool of molten magnesium chloride and is defined by a hollow domed hood extending 10" below the surface of a pool of molten magnesium chloride at about 1,400° F. in the chamber. The hood is fabricated of silica brick, as is the remainder of the chamber comprising inner and outer spaced shells joined by a peripheral wall and providing a heating space into which are circulated hot combustion gases at about 1,600° F. The outer surface of the inner shell is lined with ⅝-inch thick steel plate. The anhydrous ammonium carnallite enters the decomposition chamber through the hood and above the pool of molten magnesium chloride and drops to the surface of the pool enclosed by the hood at the rate of about 88 pounds per hour through an atmosphere comprising a positive pressure of ammonium chloride vapor, so that water vapor and oxygen are excluded from contact therewith as well as metal. The ammonium carnallite is converted to ammonium chloride at the rate of about 33 pounds per hour, which vaporizes into said atmosphere, and magnesium chloride (at the rate of about 55 pounds per hour) which melts in the pool.

Decomposition temperature is maintained by circulating molten magnesium chloride between the pool and a superheated 3-foot deep reservoir of the same (at about 1,600° F.) disposed in a separate 4-foot diameter pot of 2-inch thick welded steel. The outer surface of the described superheating chamber (pot) is direct natural gas flame fired at 2,200°-2,300° F. over a 14 square foot surface area. The molten magnesium chloride flows from the pool gravity and is pumped back from the superheating pot with the recirculation rate about 800 pounds per hour to provide an 88,000 B.t.u. heat demand in the decomposition chamber.

Molten magnesium chloride is passed from the superheating pot by gravity flow to a steel gas fired holding pot at the rate of about 55 pounds per hour wherein it is held for an average residence time of 2 hours at about 1,335° F. and then dipped therefrom at about 55 pounds per hour into covered steel molds, solidified and allowed to cool to about 150° C., then immersed in liquid polyethylene at about 120° C., removed and cooled to set the protective film therearound for storage before final use as feed to electrolyte cells for production of magnesium.

The molded magnesium chloride is relatively pure, free of magnesia, water, and other contaminants and uniform in quality. The method and apparatus operate on a continuous round the clock basis for a year at a heating cost less than one-fifth that encountered with electric units, and with no substantial deterioration in apparatus.

Ammonium chloride vapor from the decomposition chamber passes out of the hood through a jacketed monel conduit heated to about 550° F. and is converted in a redwood gas absorber unit, employing a fine water droplet mist and a fresh water input of about 11 gallons per hour, to 22 percent aqueous ammonium chloride solution which is refed to the hot reactor for use in forming ammonium carnallite. Accordingly, the system is self-sustaining except for a heating requirement and an input requirement of magnesium chloride solution.

Similarly conducted runs establish that the initial concentration of aqueous magnesium chloride and ammonium chloride can be varied, as well as decomposition temperatures (e.g., 1,370° F. and 1,450° F.) superheating pot temperatures (e.g., 1,600° F. and 1,650° F.) holding temperatures (e.g., 1,320° F., 1,350° F.), throughput, recirculation rate and other parameters, including size and shape of the equipment. A run utilizing a throughput rate to provide an output average of 2.35 tons of magnesium chloride per hour yields 20,000 tons per year on an 8,500 hour per year basis, but requires scaling up of the equipment approximately 80 fold.

Various other changes, substitutions and deletions can be made in the present method, its steps, ingredients and parameters and in the present apparatus and its components. All such changes, substitutions and deletions as are within the scope of the appended claims form part of this invention.

What is claimed is:

1. An improved method of making anhydrous purified magnesium chloride, which method comprises:
   a. passing anhydrous ammonium carnallite relative free of impurities to a decomposition zone in the absence of contaminants, including oxygen and water;

b. decomposing said ammonium carnallite in said decomposition zone to ammonium chloride vapor and molten magnesium chloride in the absence of metal and contaminants while maintaining a positive pressure of ammonium chloride vapor in said zone;

c. circulating said molten magnesium chloride between said decomposition zone and a superheating zone and maintaining at least a portion of said molten magnesium chloride in said superheating zone at a temperature substantially in excess of the melting point of said magnesium chloride, whereby magnesium chloride circulated from said superheating zone to said decomposition zone provides necessary heat for said decomposing of said ammonium carnallite;

d. passing molten magnesium chloride into a heated holding zone and maintaining said magnesium chloride in said zone at a low enough temperature above the melting point thereof to inhibit turbulence of said magnesium chloride and to allow precipitation of any magnesium oxide therein; and e. removing purified molten magnesium chloride from said holding zone and separately recovering ammonium chloride vapor from said decomposition zone.

2. The method of claim 1 wherein said decomposition zone is operated at above about 1,400° F., wherein said superheating zone is operated at above about 1,550° F., wherein said holding zone is operated slightly above about 1,325° F. and wherein said ammonium chloride vapor is recovered by water drop contact in a separate gas absorbing zone.

3. The method of claim 1 wherein said method is continuous, wherein said anhydrous ammonium carnallite is in a heated condition when passed to said decomposition zone, wherein said molten magnesium chloride in said decomposition zone is above about 1,500° F. and said molten magnesium chloride in said superheating zone is maintained above about 1,600° F. by direct gas firing of said zone and wherein during said recovery said ammonium chloride vapor is maintained out of contact with metal until the temperature thereof is below that which induces decomposition of said ammonium chloride.

* * * * *